(12) United States Patent
Honma et al.

(10) Patent No.: US 10,183,670 B2
(45) Date of Patent: Jan. 22, 2019

(54) CONTROL DEVICE FOR CONTINUOUSLY VARIABLE TRANSMISSION OF VEHICLE

(71) Applicant: JATCO Ltd, Fuji-shi, Shizuoka (JP)

(72) Inventors: Tomoaki Honma, Isehara (JP); Akihiro Tanabe, Atsugi (JP); Tomoko Sasaki, Atsugi (JP)

(73) Assignee: JATCO Ltd, Fuji-Shi (JP)

( * ) Notice: Subject to any disclaimer, the term of this patent is extended or adjusted under 35 U.S.C. 154(b) by 39 days.

(21) Appl. No.: 15/534,590

(22) PCT Filed: Sep. 24, 2015

(86) PCT No.: PCT/JP2015/076846
§ 371 (c)(1),
(2) Date: Jun. 9, 2017

(87) PCT Pub. No.: WO2016/092934
PCT Pub. Date: Jun. 16, 2016

(65) Prior Publication Data
US 2017/0349180 A1    Dec. 7, 2017

(30) Foreign Application Priority Data
Dec. 11, 2014   (JP) .................................. 2014-251262

(51) Int. Cl.
*B60W 10/107*   (2012.01)
*B60W 30/182*   (2012.01)
(Continued)

(52) U.S. Cl.
CPC ........ *B60W 30/182* (2013.01); *B60W 10/026* (2013.01); *B60W 10/107* (2013.01);
(Continued)

(58) Field of Classification Search
None
See application file for complete search history.

(56) References Cited

U.S. PATENT DOCUMENTS 5,468,196 A * 11/1995 Minowa ................ B60W 10/02
477/107
9,855,952 B2 * 1/2018 Natori .................. B60W 10/06

FOREIGN PATENT DOCUMENTS

| JP | 2002-089667 A | 3/2002 |
| JP | 2002-243031 A | 8/2002 |

(Continued)

*Primary Examiner* — Dirk Wright
(74) *Attorney, Agent, or Firm* — Foley & Lardner LLP

(57) ABSTRACT

The drive system from the engine (1) to the drive wheels (7) of a vehicle is equipped with a torque converter (2), which has a lock-up clutch (3), and a variator (4). Said engined car is provided with a lock-up control means for controlling the engagement/disengagement of the lock-up clutch (3) and a gear change mode switch-controlling means (FIG. 8) for performing control to switch between a "continuously variable gear change mode" and a "DSTEP gear change mode." While traveling, the gear change mode switch-controlling means (FIG. 8) prohibits gear change by the "DSTEP gear change mode" when the detected oil temperature is at or below a lock-up engagement-permitting threshold for permitting engagement of the lock-up clutch (3) and allows gear change by the "DSTEP gear change mode" when the detected oil temperature is higher than the lock-up engagement-permitting threshold.

7 Claims, 7 Drawing Sheets

(51) Int. Cl.
    *F16H 61/14*     (2006.01)
    *F16H 61/02*     (2006.01)
    *F16H 61/66*     (2006.01)
    *B60W 10/02*     (2006.01)
    *B60W 30/18*     (2012.01)
    *F16H 59/72*     (2006.01)

(52) U.S. Cl.
    CPC ... *B60W 30/18109* (2013.01); *F16H 61/0213* (2013.01); *F16H 61/14* (2013.01); *F16H 61/66* (2013.01); *B60W 2510/107* (2013.01); *B60W 2520/10* (2013.01); *B60W 2520/105* (2013.01); *B60W 2540/10* (2013.01); *B60W 2710/024* (2013.01); *B60W 2710/1005* (2013.01); *F16H 59/72* (2013.01); *F16H 2061/6611* (2013.01); *F16H 2061/6615* (2013.01)

(56) References Cited

FOREIGN PATENT DOCUMENTS

| | | |
|---|---|---|
| JP | 2003-074691 A | 3/2003 |
| JP | 2007-146965 A | 6/2007 |
| JP | 2014-137105 A | 7/2014 |

\* cited by examiner

CONTROL DEVICE FOR CONTINUOUSLY VARIABLE TRANSMISSION OF VEHICLE

TECHNICAL FIELD

The present invention relates to a control device for a continuously variable transmission for a vehicle where a torque converter and a continuously variable transmission mechanism are mounted in a driveline from a drive source to a driving wheel, wherein the torque converter includes a lockup clutch.

BACKGROUND ART

Conventionally known is a control device in a continuously variable transmission for a vehicle including a torque converter, wherein the control device employs a simulated step shift mode, wherein the simulated step shift mode is configured to set a target input rotational speed so as to repeat gradual increase and rapid decrease of a transmission input rotational speed during acceleration of the vehicle, and thereby vary a transmission ratio in a stepwise manner (see a patent document 1, for example).

However, if the simulated step shift mode is performed at low oil temperature in the conventional vehicular continuously variable transmission control device, the transmission input rotational speed becomes unstable, for example, because an engine rotational speed does not fall but remains high even when an upshift is performed. This causes a problem that a driver may feel uncomfortable when the simulated step shift mode is employed for shifting at low oil temperature.

PRIOR ART DOCUMENT(S)

Patent Document(s)

Patent Document 1: JP 2014-137105 A

SUMMARY OF THE INVENTION

The present invention is made with attention to the problem described above, and is targeted for providing a vehicular continuously variable transmission control device that provides a driver with a direct step shift feel by simulated step shifting while suppressing the driver from feeling uncomfortable.

In order to accomplish the target described above, according to the present invention, a vehicle is provided with a torque converter and a continuously variable transmission mechanism are mounted in a driveline from a drive source to a driving wheel, wherein the torque converter includes a lockup clutch. A lockup control means, a shift mode switching control means, and an oil temperature sensing means are provided in the vehicle. The lockup control means is configured to control engagement and disengagement of the lockup clutch. The shift mode switching control means is configured to control switching between a continuous shift mode and a simulated step shift mode, wherein the continuous shift mode is configured to vary a transmission ratio of the continuously variable transmission mechanism in a continuous manner, and wherein the simulated step shift mode is configured to vary the transmission ratio of the continuously variable transmission mechanism in a stepwise manner. The oil temperature sensing means is configured to sense an oil temperature of working oil for shifting of the continuously variable transmission mechanism. The shift mode switching control means is further configured to: permit engagement of the lockup clutch, in response to a condition that a sensed value of the oil temperature is higher than a first oil temperature threshold value while the vehicle is running; inhibit the simulated step shift mode from being to employed for shifting, in response to a condition that the sensed value of the oil temperature is lower than or equal to a second oil temperature threshold value, wherein the second oil temperature threshold value is set higher than or equal to the first oil temperature threshold value; and permit the simulated step shift mode to be employed for shifting, in response to a condition that the sensed value of the oil temperature is higher than the second oil temperature threshold value.

Accordingly, when the sensed value of the oil temperature is higher than the first oil temperature threshold value while the vehicle is running, engagement of the lockup clutch is permitted. When the sensed value of the oil temperature is lower than or equal to the second oil temperature threshold value, wherein the second oil temperature threshold value is set higher than or equal to the first oil temperature threshold value, the simulated step shift mode is inhibited from being employed for shifting. When the sensed value of the oil temperature is higher than the second oil temperature threshold value, the simulated step shift mode is permitted to be employed for shifting. Namely, when the vehicle is running under the oil temperature condition where the lockup clutch is disengaged, the simulated step shift mode is inhibited from being employed for shifting. This serves to suppress a driver from feeling uncomfortable due to lack of stability of the transmission input rotational speed as in the case where the simulated step shift mode is permitted for shifting at low oil temperature. Then, when the vehicle is running under the oil temperature condition where the lockup clutch is engaged, the simulated step shift mode is permitted to be employed for shifting. This serves to provide simulated step shifting with direct connection between the drive source and the continuously variable transmission mechanism, and cause the transmission input rotational speed to follow a stepwise change of the transmission ratio, and thereby provide the driver with a direct step shift feel. This results in providing the driver with the direct step shift feel by simulated step shifting while suppressing the driver from feeling uncomfortable.

MODE(S) FOR CARRYING OUT THE INVENTION

Figure 1:
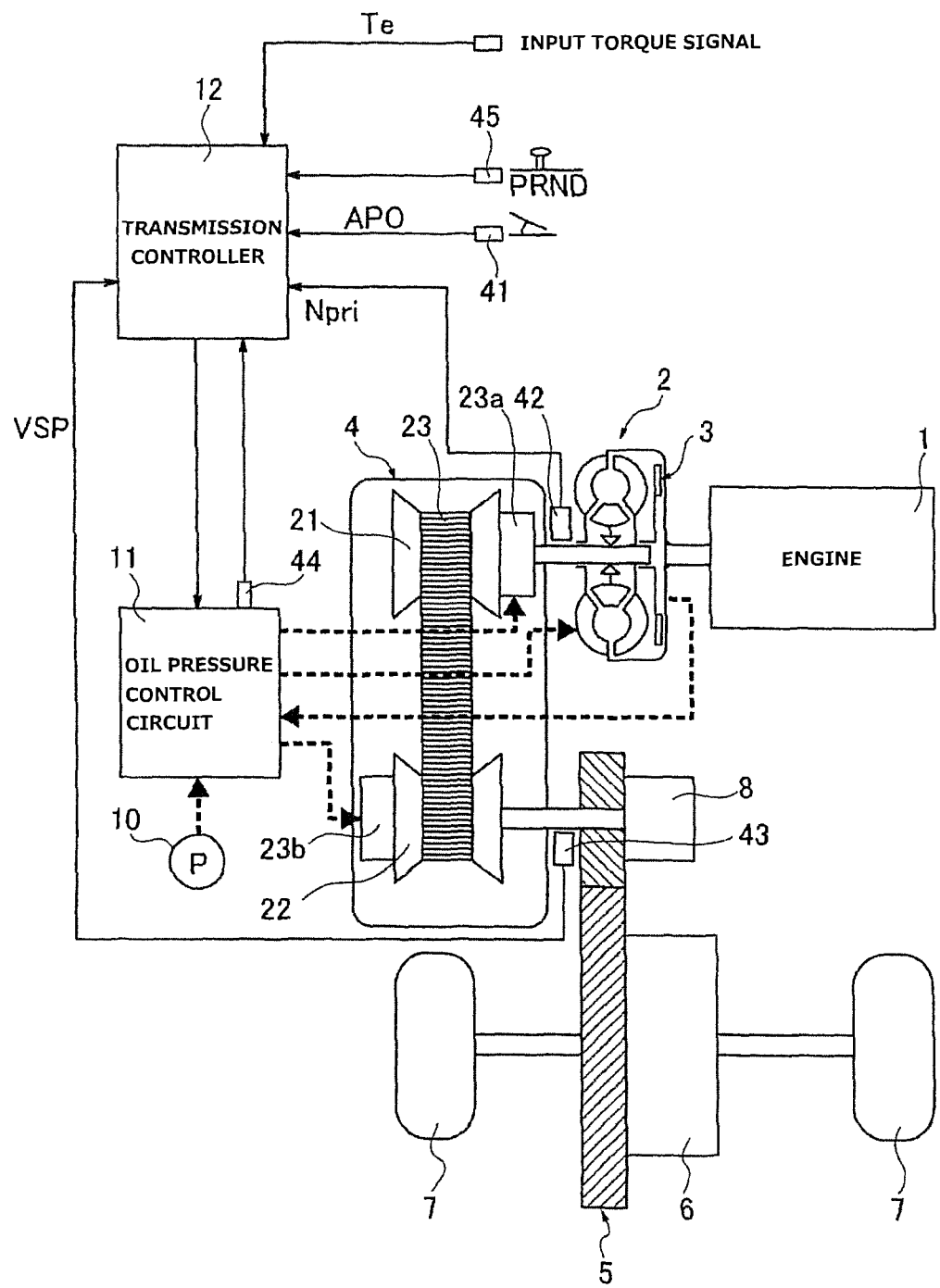
FIG. 1 is a whole diagram showing schematic configuration of an engine vehicle where a vehicular continuously variable transmission, to which a control device according to a first embodiment is applied, is mounted.

The following describes the best mode for carrying out a vehicular continuously variable transmission control device according to the present invention, with reference to a first embodiment shown in the drawings.

First Embodiment

First, the following describes configuration. The control device according to the first embodiment is applied to an engine vehicle where a torque converter with a lockup clutch and a belt-type continuously variable transmission are mounted in a drive line. The following describes configuration of the vehicular continuously variable transmission control device according to the first embodiment in separate sections [Whole System Configuration], [Lockup Control Configuration], [Shift Control Configuration in Continuous Shift Mode], [Shift Control Configuration in Linear Shift Mode], [Shift Control Configuration in DSTEP Shift Mode], and [Shift Mode Switching Control Process Configuration].

Figure 2:
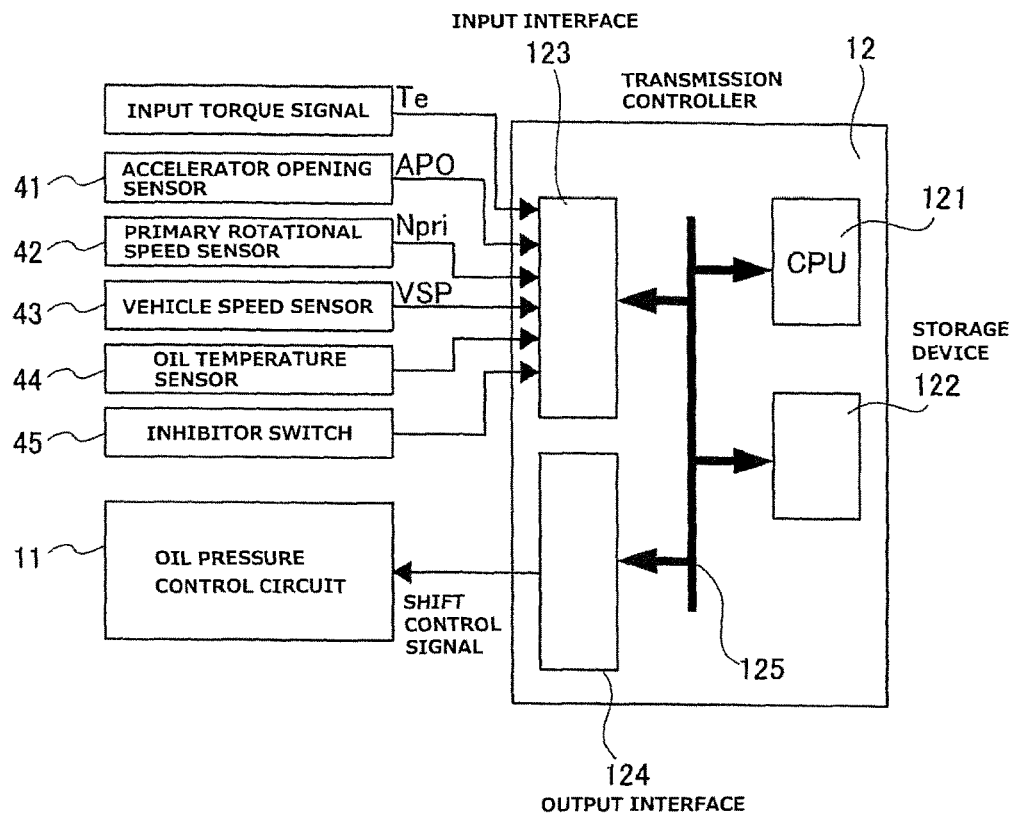
FIG. 2 is a block diagram showing internal configuration of a transmission controller according to the first embodiment.

[Whole System Configuration] FIG. 1 shows schematic configuration of an engine vehicle where a vehicular continuously variable transmission, to which a control device according to a first embodiment is applied, is mounted. FIG. 2 shows internal configuration of a transmission controller. The following describes whole system configuration with reference to FIGS. 1 and 2.

As shown in FIG. 1, the drive line of the engine vehicle includes an engine 1 (drive source), a torque converter 2, a lockup clutch 3, a variator 4 (continuously variable transmission mechanism), an output gear arrangement 5, a differential 6, and driving wheels 7. Output gear arrangement 5 is provided with a parking mechanism 8 configured to lock mechanically an output shaft of variator 4 and thereby prevent rotation of the output shaft of variator 4 during parking.

Torque converter 2 is a fluid joint including a pump impeller, a turbine runner, and a stator. Lockup clutch 3 is mounted in torque converter 2, and configured to establish direct connection between an engine output shaft and a variator input shaft by clutch engagement. Namely, when lockup clutch 3 is disengaged, an engine driving torque is transmitted to driving wheels 7 through torque converter 2, variator 4, output gear arrangement 5, and differential 6 in this order. On the other hand, when lockup clutch 3 is engaged, the engine driving torque is transmitted to driving wheels 7 through lockup clutch 3, variator 4, output gear arrangement 5, and differential 6 in this order.

Variator 4 is a belt-type continuously variable transmission mechanism including a primary pulley 21, a secondary pulley 22, and a V-belt 23, wherein V-belt 23 is wound around pulleys 21, 22. Each pulley 21, 22 includes a fixed cone plate, a movable cone plate, and an oil pressure cylinder 23a, 23b, wherein the movable cone plate is arranged such that its sheave surface faces the fixed cone plate, and forms a V-groove between the movable cone plate and the fixed cone plate, and wherein oil pressure cylinder 23a, 23b is disposed at a back side of the movable cone plate, and configured to move the movable cone plate in an axial direction. Adjustment of oil pressure supplied to oil pressure cylinder 23a, 23b causes a change in width of the V-groove, and thereby causes a change in semi-diameter of contact between V-belt 23 and each pulley 21, 22, and thereby varies a transmission ratio of variator 4 continuously.

The engine vehicle includes an oil pump 10, an oil pressure control circuit 11, and a transmission controller 12, is wherein oil pump 10 is driven by part of power of engine 1, wherein oil pressure control circuit 11 is configured to regulate oil pressure from oil pump 10, and supply the regulated oil pressure to components of variator 4, and wherein transmission controller 12 is configured to control oil pressure control circuit 11. The following describes each component.

As shown in FIG. 2, transmission controller 12 includes a CPU 121, a storage device 122, an input interface 123, an output interface 124, and a bus 125, wherein storage device 122 is composed of RAM and ROM, and wherein bus 125 connects these components to each other.

Input interface 123 receives input of output signals from an accelerator opening sensor 41, a primary rotational speed sensor 42, and a vehicle speed sensor 43, wherein accelerator opening sensor 41 is configured to sense an accelerator opening APO, wherein primary rotational speed sensor 42 is configured to sense a primary rotational speed Npri of variator 4, and wherein vehicle speed sensor 43 is configured to sense a vehicle speed VSP. Input interface 123 further receives input of an output signal from an oil temperature sensor 44 (oil temperature sensing means), an output signal from an inhibitor switch 45, and an output torque signal Te from engine 1, wherein oil temperature sensor 44 is configured to sense an oil temperature of working oil in an oil pan (ATF oil temperature), wherein the working oil is used for shifting of variator 4, and wherein inhibitor switch 45 is configured to sense the position of a select lever.

Storage device 122 stores a program for control of engagement and disengagement of lockup clutch 3, and a lockup map (see FIG. 3) used by the program. Storage device 122 further stores a program for shift control of variator 4, and a shift map (see FIG. 4) used by this program. CPU 121 is configured to read the control programs stored in storage device 122, and execute the read control programs, and generate a shift control signal by applying various calculation processes to various signals inputted through the input interface 123, and output the generated shift control signal to oil pressure control circuit 11 via the output interface 124. Various values used in the calculation processes by CPU 121, and results of calculation are stored in storage device 122 as appropriate.

Oil pressure control circuit 11 includes a plurality of fluid passages and a plurality of oil pressure control valves. Oil pressure control circuit 11 is configured to switch supply passages of oil pressure by controlling the plurality of oil pressure control valves, and produce a required oil pressure by regulating the oil pressure generated by oil pump 10, based on the shift control signal from transmission controller 12. By this oil pressure control, the engagement and disengagement of lockup clutch 3 and the transmission ratio of variator 4 are controlled.

Figure 3:
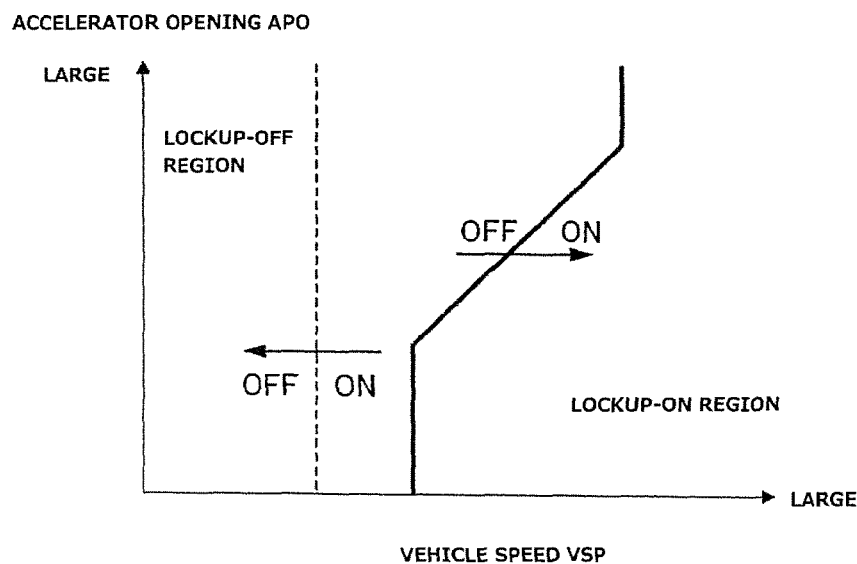
FIG. 3 is a lockup map diagram showing an example of lockup map used for control of engagement and disengagement of a lockup clutch by the transmission controller according to the first embodiment.

[Lockup Control Configuration] FIG. 3 shows an example of lockup map used for control of engagement and disengagement of lockup clutch 3 by transmission controller 12 according to the first embodiment. The following describes lockup clutch control configuration (lockup clutch control means) with reference to FIG. 3.

The lockup control is defined as a switching control between engagement and disengagement of lockup clutch 3 which is performed based on an ATF oil temperature condition and a vehicle drive condition (vehicle speed VSP, accelerator opening APO). For the lockup control, a lockup engagement permission threshold value is set as an ATF oil temperature condition, wherein when the ATF oil temperature is lower than or equal to the lockup engagement permission threshold value, engagement of lockup clutch 3 is inhibited irrespective of the vehicle drive condition. When the ATF oil temperature is higher than the lockup engagement permission threshold value, engagement of lockup clutch 3 is permitted, and the switching control between engagement and disengagement of lockup clutch 3 is performed based on the vehicle drive condition (vehicle speed VSP, accelerator opening APO) and the lockup map shown in FIG. 3.

The lockup engagement permission threshold value is set to an oil temperature value such that the lockup can be released within a target time period of response of oil pressure, wherein the target time period of response of oil pressure is a time period required for completing a disengagement of lockup clutch 3 after commanding the disengagement of lockup clutch 3, and is a time period allowing completion of release of the lockup before the vehicle is rapidly decelerated to a halt. The target time period of response of oil pressure when lockup clutch 3 is disengaged is determined so as to prevent engine stalling during rapid deceleration of the vehicle to a halt, and is thereby shorter than the target time period of response of oil pressure requested when lockup clutch 3 is engaged. Therefore, the lockup engagement permission threshold value for the ATF oil temperature is set to a higher oil temperature value (+10° C., for example) than an oil temperature value (±0° C., for example) with which a requested response of lockup engagement can be obtained.

Employing the lockup map, the lockup control is configured to issue a lockup engagement request to engage the disengaged lockup clutch 3, when an operating point defined by vehicle speed VSP and accelerator opening APO crosses an OFF-to-ON line in FIG. 3. On the other hand, the lockup control is configured to issue a lockup disengagement request to disengage the engaged lockup clutch 3, when the operating point defined by vehicle speed VSP and accelerator opening APO crosses an ON-to-OFF line in FIG. 3. The lockup map is set so as to enhance fuel economy when the vehicle is driven to be running by depression of an accelerator, so that the OFF-to-ON line and the ON-to-OFF line are set in a region of low vehicle speed about 10 km/h.

Figure 4:
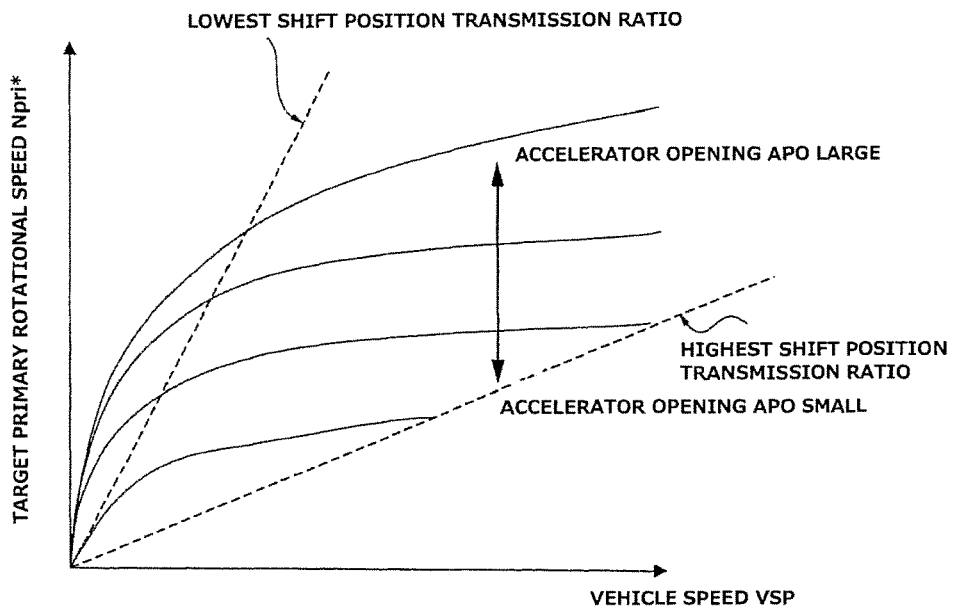
FIG. 4 is a continuous shift map diagram showing an example of continuous shift map used when a continuous shift mode is selected in the transmission controller according to the first embodiment.

[Shift Control Configuration in Continuous Shift Mode] FIG. 4 shows an example of continuous shift map used when a continuous shift mode is selected in transmission controller 12 according to the first embodiment. The following describes a shift control configuration in the continuous shift mode with reference to FIG. 4.

Transmission controller 12 employs as shift modes the continuous shift mode, a linear shift mode, and a DSTEP shift mode (simulated step shift mode). Of them, the continuous shift mode, which is configured to vary the transmission ratio of variator 4 continuously by using the continuous shift map shown in FIG. 4, is a normal shift control mode performed unless the linear shift mode or the DSTEP shift mode is selected.

The shift control in the continuous shift mode is configured to determine a target primary rotational speed Npri* corresponding to vehicle speed VSP and accelerator opening APO with reference to the continuous shift map shown in FIG. 4, and vary the transmission ratio of variator 4 continuously to conform actual primary rotational speed Npri to target primary rotational speed Npri*. The continuous shift map shown in FIG. 4 is set with fuel economy weighted. For example, if accelerator opening APO is constant, target primary rotational speed Npri* (equal to the transmission input rotational speed) is maintained as constant as possible. Moreover, the continuous shift map is set such that the transmission ratio is varied continuously in a range of transmission ratio from a lowest shift position transmission ratio to a highest shift position transmission ratio which can be set by variator 4.

Figure 5:
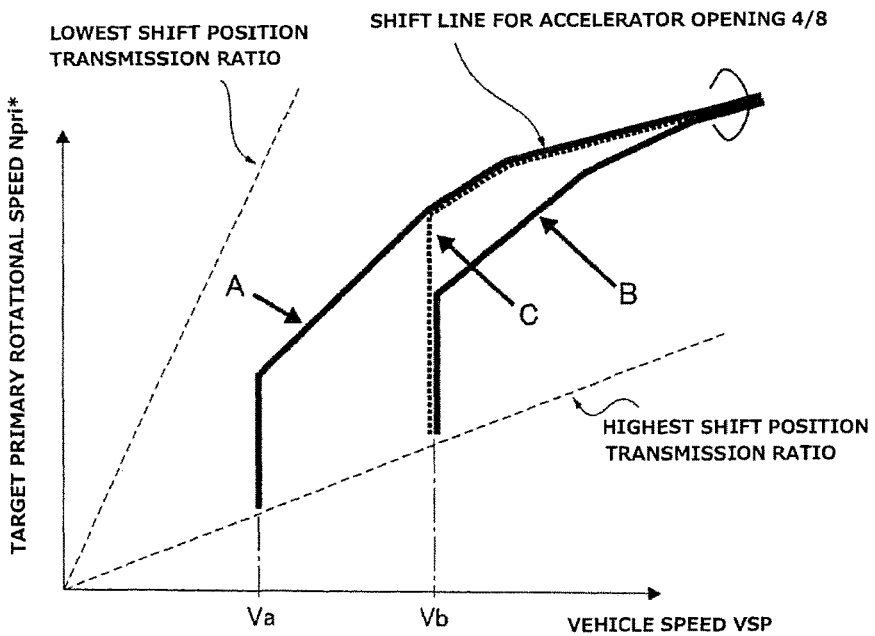
FIG. 5 is a for-acceleration shift line diagram showing an example of for-acceleration shift line generated when a linear shift mode is selected in the transmission controller according to the first embodiment.
Figure 6:
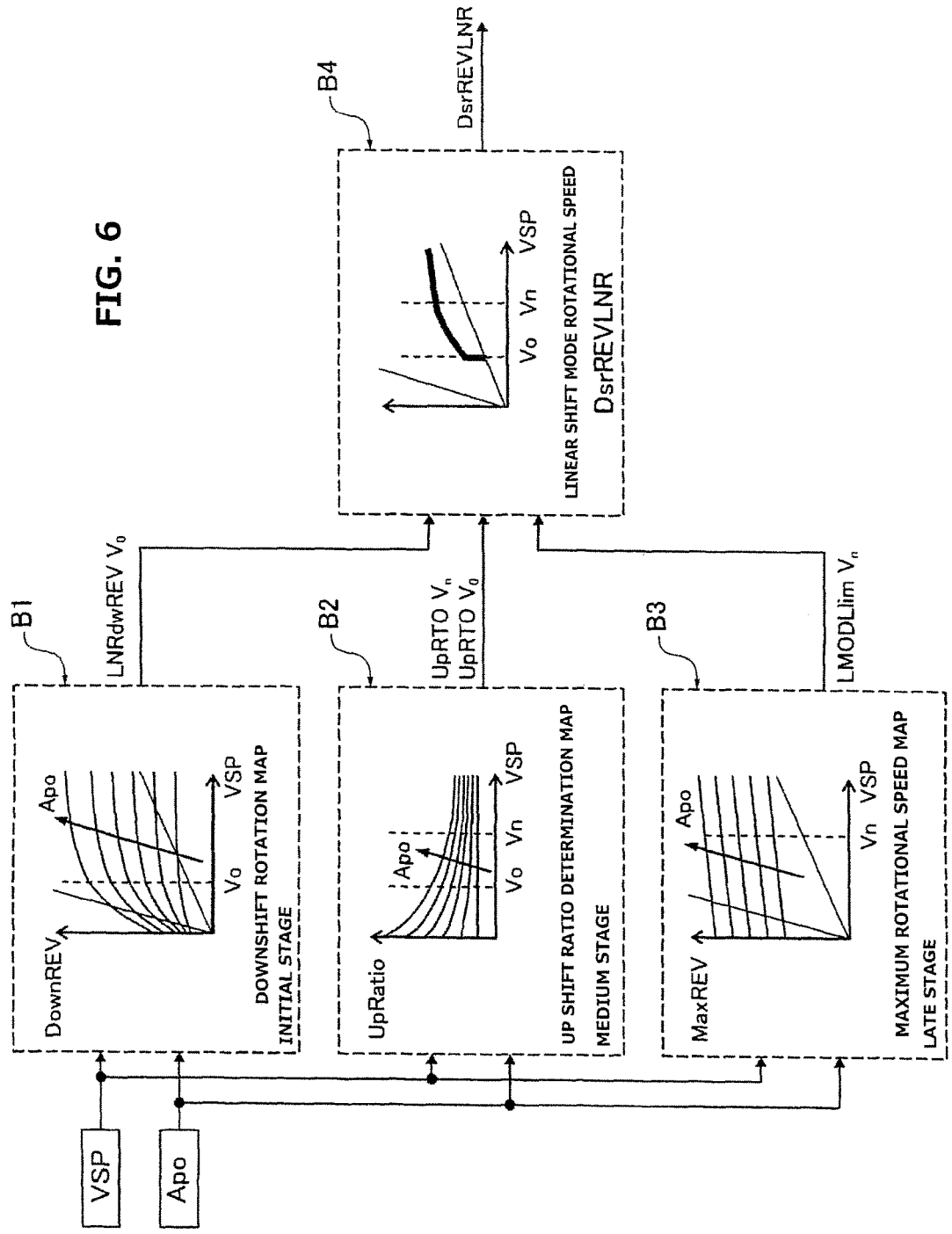
FIG. 6 is a for-acceleration shift line calculation block diagram showing calculation blocks for generating a for-acceleration shift line when the linear shift mode is selected in the transmission controller according to the first embodiment.

[Shift Control Configuration in Linear Shift Mode] FIG. 5 shows an example of for-acceleration shift line generated when the linear shift mode is selected in transmission controller 12 according to the first embodiment. FIG. 6 shows calculation blocks for generating a for-acceleration shift line. The following describes a shift control configuration in the linear shift mode with reference to FIGS. 5 and 6.

The linear shift mode is a mode configured to generate a for-acceleration shift line when depressing operation of the accelerator is performed which indicates a driver's acceleration request, and therewith control the transmission ratio. The shift control of the linear shift mode is started in response to a condition that depressing speed of the accelerator is large, and the accelerator opening is larger by a predetermined value than a R/L opening (road/load opening) for maintaining the vehicle speed constant. The linear shift mode has the following two features.

(a) The linear shift mode is configured to generate a for-acceleration shift line available in any region of vehicle sped (FIG. 5).

For example, when the accelerator is depressed again at vehicle speed Vb in the continuous shift mode, target primary rotational speed Npri* rises in one stroke, and vehicle speed VSP thereafter rises along a shift line corresponding to an accelerator opening after the depression of the accelerator (for example, ⅘-opening), as shown by a characteristic C indicated by a broken line in FIG. 5. Namely, an initial downshift is large, but an upshift occurs immediately after that, thereby providing no feel of extension of acceleration. In contrast, when the accelerator is depressed again at vehicle speed Vb in the linear shift mode, target primary rotational speed Npri* rises to a predetermined rotational speed, and vehicle speed VSP thereafter rises along a for-acceleration shift line climbing rightward where the transmission ratio is maintained, as shown by a characteristic B indicated by a solid line in FIG. 5. Namely, an initial downshift is suppressed, and the transmission ratio is thereafter maintained, thereby providing a good acceleration feel. When the vehicle speed at re-acceleration is equal to vehicle speed Va that is different from vehicle speed Vb, a for-acceleration shift line is generated with respect to vehicle speed Va as occasion arises, as shown by a characteristic A indicated by a solid line in FIG. 5.

(b) The linear shift mode is configured to separate the acceleration into three phases, and set a fitting constant, and ensure design flexibility (FIG. 6).

Namely, the acceleration is separated into three phases (an initial phase, a medium phase, and a late phase), and the three phases are set as follows. The initial phase is specified by a downshift rotational speed LNRdwREV Vo which is determined by vehicle speed VSP and accelerator opening APO as parameters by using at-depression vehicle speed Vo and a downshift rotation map, as shown in a block B1. The medium phase is specified by an upshift quantity UpRTO Vo and an upshift quantity UpRTO Vn which accompany the rise of vehicle speed VSP, and are determined by using at-depression vehicle speed Vo, current vehicle speed Vn, and an up shift ratio determination map, as shown in a block B2. The late phase is specified by a maximum rotational speed LMODLlim Vn which is determined by vehicle speed VSP and accelerator opening APO as parameters by using current vehicle speed Vn and a maximum rotational speed map, as shown in a block B3. Then, in a block B4, these specific values are used to calculate a linear shift mode rotational speed DsrREVLNR by using the following equation.

DratioLNR=(LNRdwREV Vo/LNRoutREV Vo)+
(UpRTO Vn−UpRTO Vo)

DsrREVLNR=MIN{DratioLNR×OutREV,LMO-
DLlim Vn}

A condition for cancelling the linear shift control is a condition where quick release operation of the accelerator is made, or a predetermined time period has elapsed after the accelerator opening becomes smaller than or equal to a predetermined value.

Figure 7:
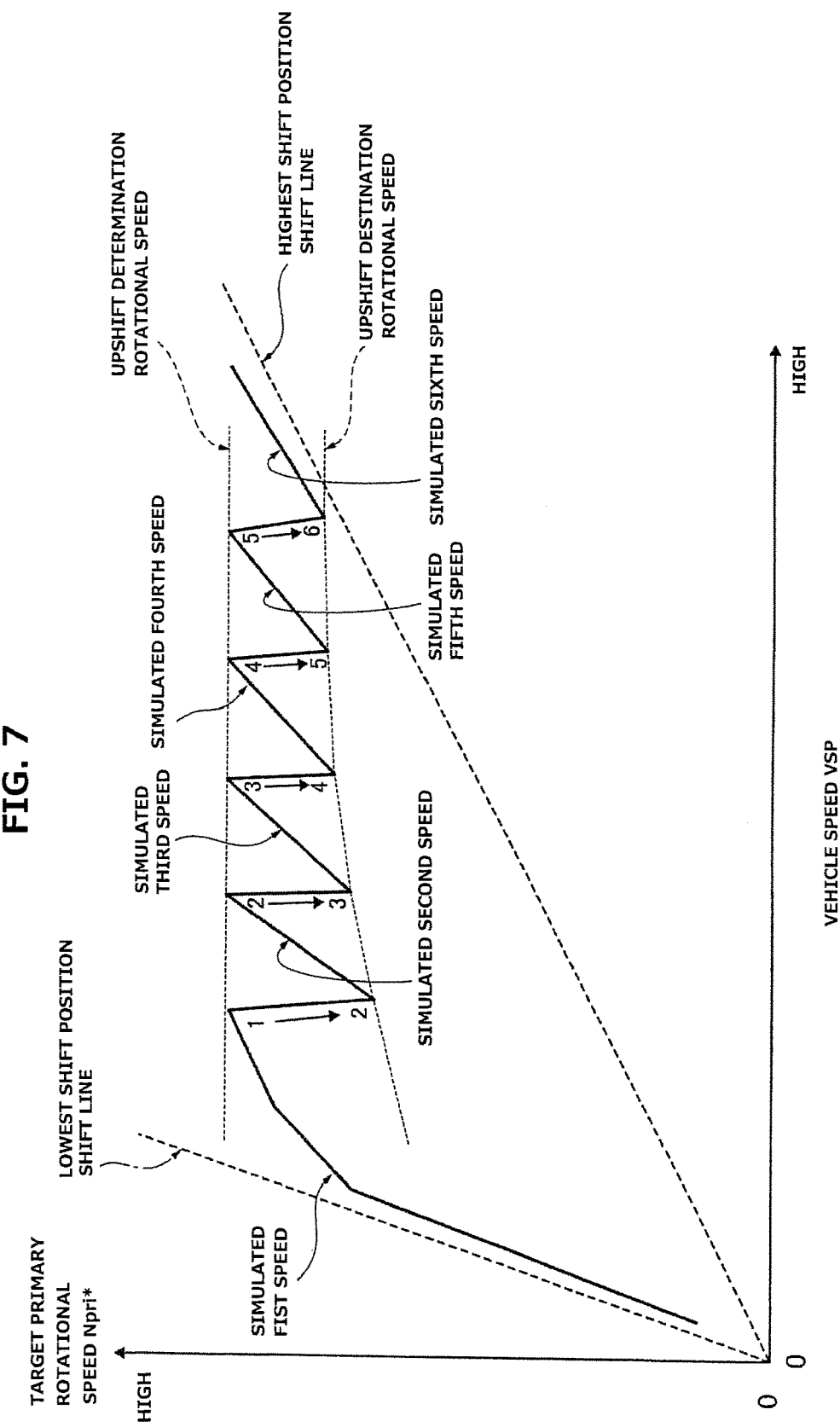
FIG. 7 is a DSTEP shift line diagram showing an example of DSTEP shift line used when a DSTEP shift mode (i.e. dummy or simulated step shift mode) is selected in the transmission controller according to the first embodiment.

[Shift Control Configuration in DSTEP Shift Mode] FIG. 7 shows an example of DSTEP shift line used when the DSTEP shift mode (i.e. dummy or simulated step shift mode) is selected in transmission controller 12 according to the first embodiment. The following describes a shift control configuration in the DSTEP shift mode with reference to FIG. 7.

The DSTEP shift mode is an upshift mode in which step shifting is simulated to vary the transmission ratio of variator 4 in a stepwise manner. A start condition for the shift control of the DSTEP shift mode is a condition that accelerator opening APO is larger than or equal to a predetermined value (for example, ⅘-opening), and the operating point defined by vehicle speed VSP and accelerator opening APO crosses a DSTEP shift line.

As shown in FIG. 7, the DSTEP shift mode is configured to set a DSTEP shift line (a step shift line indicated by a bold solid line) per accelerator opening, in which the target primary rotational speed is changed up and down in a region of input rotational speed sandwiched between an upshift determination rotational speed and an upshift destination rotational speed, to simulate step shifting. Namely, the DSTEP shift mode is a mode where stepwise upshifting is performed by using a DSTEP shift line as shown in FIG. 7, while the vehicle is running under acceleration where the vehicle speed is increased with high accelerator opening.

As shown in FIG. 7, the DSTEP shift line shows a sawtooth characteristic of change of target primary rotational speed Npri* where upshift operations are repeated from a simulated first speed position to a simulated sixth speed position. For example, when the primary rotational speed (equal to the transmission input rotational speed) reaches the upshift determination rotational speed on the higher rotational speed side in the simulated first speed position, the primary rotational speed is reduced to make an upshift from the simulated first speed position to a simulated second speed position. When the primary rotational speed reaches the upshift destination rotational speed on the lower rotational speed side, the simulated second speed position is entered. Thereafter, similar upshift operations are repeated from the simulated second speed position to the simulated sixth speed position.

Figure 8:
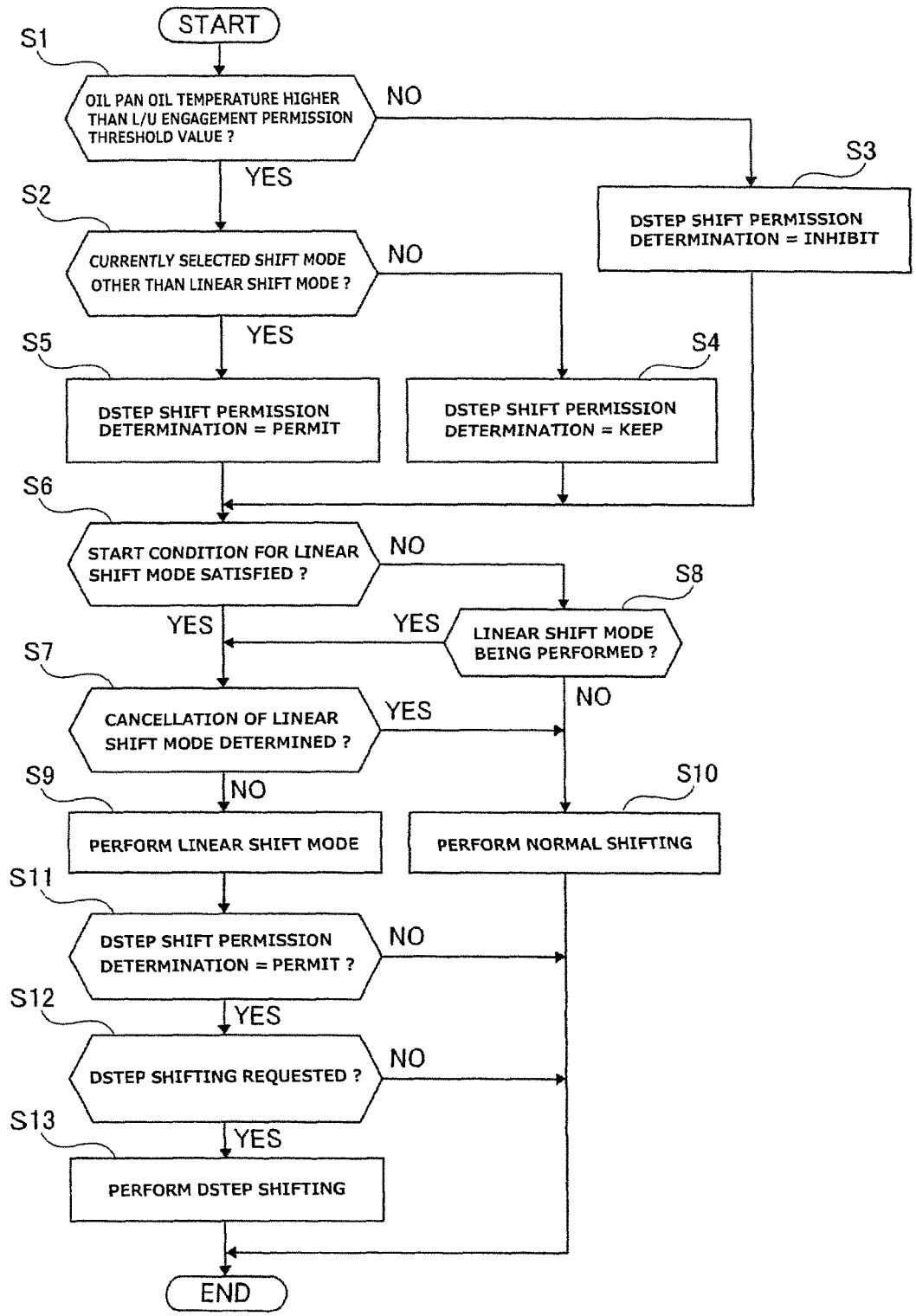
FIG. 8 is a flow chart showing a flow of a shift mode switching control process performed by the transmission controller according to the first embodiment.

[Shift Mode Switching Control Process Configuration] FIG. 8 shows a flow of a shift mode switching control process performed by transmission controller 12 according to the first embodiment (shift mode switching control means). The following describes steps in FIG. 8, which show configuration of the shift mode switching control process. This process is performed repeatedly at intervals of a predetermined time period of calculation operation.

At Step S1, transmission controller 12 determines whether or not an oil pan oil temperature sensed by oil temperature sensor 44 is higher than the lockup engagement permission threshold value (first threshold value, second threshold value). In the case of YES (the oil pan oil temperature >the lockup engagement permission threshold value), transmission controller 12 proceeds to Step S2. In the case of NO (the oil pan oil temperature ≤the lockup engagement permission threshold value), transmission controller 12 proceeds to Step S3.

At Step S2, following the determination at Step S1 (the oil pan oil temperature >the lockup engagement permission threshold value), transmission controller 12 determines whether or not the currently selected shift mode is other than the linear shift mode. In the case of YES (other than the linear shift mode), transmission controller 12 proceeds to Step S5. In the case of NO (being in the linear shift mode), transmission controller 12 proceeds to Step S4.

At Step S3, following the determination at Step S1 (the oil pan oil temperature ≤the lockup engagement permission threshold value), transmission controller 12 sets the DSTEP shift permission determination to inhibition, and proceeds to Step S6.

At Step S4, following the determination at Step S2 (being in the linear shift mode), transmission controller 12 sets the DSTEP shift permission determination to keeping, and proceeds to Step S6. The state of keeping of the DSTEP shift permission determination works so that if the linear shift mode is being selected when the oil temperature condition of Step S1 shifts from the unsatisfied state (the DSTEP shift permission determination=inhibition) to the satisfied state, the condition of [the DSTEP shift permission determination=inhibition] is kept. On the other hand, if the oil temperature condition is satisfied at Step S1, and transmission controller 12 thereafter proceeds to Step S5 where the condition of [the DSTEP shift permission determination=permission] is experienced, the condition of [the DSTEP shift permission determination=permission] is kept even in the linear shift mode.

At Step S5, following the determination at Step S2 (being other than the linear shift mode), transmission controller 12 sets the DSTEP shift permission determination to permission, and proceeds to Step S6.

At Step S6, following the output of results of the DSTEP shift permission determination at Steps S3, S4, S5, transmission controller 12 determines whether or not the start condition for the linear shift mode is satisfied. In the case of YES (the start condition for the linear shift mode is satisfied), transmission controller 12 proceeds to Step S7. In the case of NO (the start condition for the linear shift mode is unsatisfied, i.e. the linear shift mode is inhibited), transmission controller 12 proceeds to Step S8.

At Step S7, following the determination at Step S6 that the start condition for the linear shift mode is satisfied, transmission controller 12 determines whether or not the determination for cancelling the linear shift mode is present. In the case of YES (the determination for cancelling the linear shift mode is present), transmission controller 12 proceeds to Step S10. In the case of NO (the determination for cancelling the linear shift mode is absent), transmission controller 12 proceeds to Step S9.

At Step S8, following the determination at Step S6 that the start condition for the linear shift mode is unsatisfied, transmission controller 12 determines whether or not the linear shift mode is being performed. In the case of YES (the linear shift mode is being performed), transmission controller 12 proceeds to Step S7. In the case of NO (the linear shift mode is not being performed), transmission controller 12 proceeds to Step S10.

At Step S9, following the determination at Step S7 that the determination for cancelling the linear shift mode is absent, transmission controller 12 performs the shift control based on the linear shift mode, and proceeds to Step S11.

At Step S10, following the determination at Step S7 that the determination for cancelling the linear shift mode is present, or the determination at Step S8 that the linear shift mode is not being performed, transmission controller 12 performs the normal shifting based on the continuous shift mode, and proceeds to the end.

At Step S11, following the performing the linear shift mode at Step S9, transmission controller 12 determines whether or not the DSTEP shift permission determination is set to one of permission and permission keeping. In the case of YES (the DSTEP shift permission determination is set to one of permission and permission keeping), transmission controller 12 proceeds to Step S12. In the case of NO (the DSTEP shift permission determination is set to one of inhibition and inhibition keeping), transmission controller 12 proceeds to the end.

At Step S12, following the determination at Step S11 that the DSTEP shift permission determination is set to one of permission and permission keeping, transmission controller 12 determines whether or not the DSTEP shift request is present. In the case of YES (the DSTEP shift request is present), transmission controller 12 proceeds to Step S13. In the case of NO (the DSTEP shift request is absent), transmission controller 12 proceeds to the end. The DSTEP shift request is determined as being present when the operating point (VSP, APO) crosses the DSTEP shift line.

At Step S13, following the determination at Step S12 that the DSTEP shift request is present, transmission controller 12 performs the DSTEP shifting, and proceeds to the end.

The following describes operation. The operation of the vehicular continuously variable transmission control device according to the first embodiment is described in separate sections [Operation by Shift Mode Switching Control Process], [Whole Operation by Shift Mode Switching Control], and [Other Characteristic Operation by Shift Mode Switching Control].

[Operation by Shift Mode Switching Control Process] The following describes operation by the shift mode switching control process with reference to the flow chart shown in FIG. 8. First, when the oil pan oil temperature is low, and it is determined that the oil pan oil temperature ≤the lockup engagement permission threshold value, and the start condition for the linear shift mode is satisfied, the shift mode switching control process proceeds to Step S1, Step S3, Step S6, Step S7, Step S9, Step S11, and the end in the flow chart of FIG. 8. At Step S9, the shift control based on the linear shift mode is performed.

Next, when the oil pan oil temperature rises, and it is determined that the oil pan oil temperature >the lockup engagement permission threshold value, but the inhibition keeping is determined due to being in the linear shift mode, the shift mode switching control process proceeds to Step S1, Step S2, Step S4, Step S6, Step S7, Step S9, Step S11, and the end in the flow chart of FIG. 8.

Next, when it is determined that the oil pan oil temperature >the lockup engagement permission threshold value, and it is other than the linear shift mode, the shift mode switching control process proceeds to Step S1, Step S2, and Step S5 in the flow chart of FIG. 8. At Step S5, the DSTEP shift permission determination is set to permission. When the DSTEP shift permission determination is set to permission at Step S5, the state of permission of the DSTEP shift permission determination is kept even when the linear shift mode thereafter becomes being selected.

However, while it is determined at Step S12 that the DSTEP shift request is absent, the shift mode switching control process proceeds from Step S12 to the end, and performs the shifting based on the linear shift mode. Thereafter, when it is determined at Step S12 that the operating point (VSP, APO) crosses the DSTEP shift line and the DSTEP shift request is present, the shift mode switching control process proceeds from Step S12 to Step S13. At Step S13, the DSTEP shifting based on the DSTEP shift mode is performed.

Figure 9:
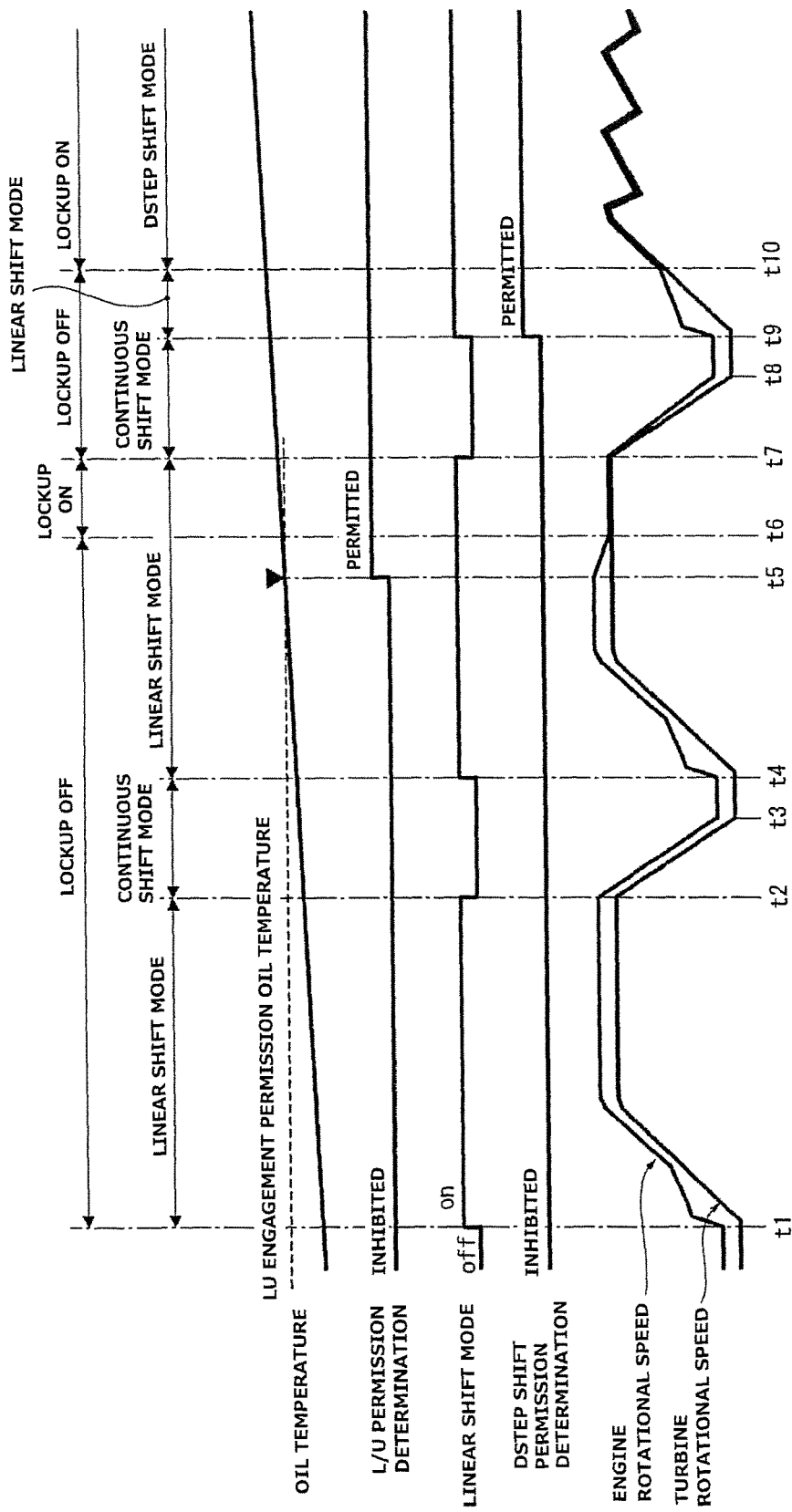
FIG. 9 is a time chart showing characteristics of oil temperature, L/U permission determination, linear shift mode, DSTEP shift permission determination, engine rotational speed, and turbine rotational speed, in a situation where an oil temperature rises when stop and start of the engine vehicle are repeated after a low oil temperature start of the engine vehicle where the vehicular continuously variable transmission according to the first embodiment is mounted.

[Whole Operation by Shift Mode Switching Control] FIG. 9 shows characteristics in a situation where the oil temperature rises when stop and start of the engine vehicle are repeated after a low oil temperature start of the engine vehicle where the vehicular continuously variable transmission according to the first embodiment is mounted. The following describes the whole operation by the shift mode switching control with reference to the time chart of FIG. 9.

In FIG. 9, a time instant t1 is a time instant when the accelerator is depressed to start the vehicle. A time instant t2 is a time instant when deceleration of the vehicle is started by foot release of the accelerator. A time instant t3 is a time instant when the vehicle is stopped. A time instant t4 is a time instant when the vehicle is restarted by depression of the accelerator. A time instant t5 is a time instant when the lockup is determined to be permitted based on the ATF oil temperature. A time instant t6 is a time instant when complete engagement of the lockup is started. A time instant t7 is a time instant when the lockup is released, and deceleration of the vehicle is started by foot release of the accelerator. A time instant t8 is a time instant when the vehicle is stopped. A time instant t9 is a time instant when the vehicle is restarted again by depression of the accelerator. A time instant t10 is a time instant when the lockup is completely engaged and the DSTEP shift control is started.

When the vehicle is started by depressing operation of the accelerator at low oil temperature at time instant t1, the shift control based on the linear shift mode is started with lockup clutch 3 disengaged. Then, when foot release operation of the accelerator is performed in order to stop the vehicle at time instant t2, the condition for cancelling the shift control based on the linear shift mode is satisfied so that the shift mode is switched from the linear shift mode to the continuous shift mode. When the vehicle is stopped at time instant t3, and the accelerator is depressed in order to restart the vehicle at time instant t4, the shift control based on the linear shift mode is started with lockup clutch 3 disengaged.

Thereafter, at time instant t5 when the ATF oil temperature is higher than the lockup engagement permission threshold value, the command for lockup engagement is issued so that the lockup clutch 3 is completely engaged, and the engine rotational speed becomes completely identical to the turbine rotational speed at time instant t6. Then, when foot release operation of the accelerator is performed in order to stop the vehicle at time instant t7, the condition for cancelling the shift control based on the linear shift mode is satisfied so that the shift mode is switched from the linear shift mode to the continuous shift mode. Then, the vehicle is stopped at time instant t8. When the accelerator is depressed in order to restart the vehicle again at time instant t9, the shift control based on the linear shift mode is started with lockup clutch 3 disengaged. Then, at time instant t10, the lockup clutch 3 is completely engaged, and the shift mode is switched from the linear shift mode to the DSTEP shift mode. This is caused by the condition that the DSTEP shift permission determination=permission is kept, and it is determined that the DSTEP shift request is present.

Accordingly, when the oil temperature is rising while the vehicle is stopped and started repeatedly from the vehicle start at low oil temperature, the shift control based on the DSTEP shift mode is inhibited until time instant t5 when the ATF oil temperature becomes higher than the lockup engagement permission threshold value. On the other hand, at and after time instant t5 when the ATF oil temperature becomes higher than the lockup engagement permission threshold value, the shift control based on the DSTEP shift mode is permitted. In the time chart of FIG. 9, at time instant t10 when the condition other than the oil condition is satisfied, the DSTEP shift control is started. After time instant t10, the DSTEP shift control continues to be performed with lockup clutch 3 engaged completely.

[Characteristic Operation by Shift Mode Switching Control] According to the first embodiment, the shifting based on the DSTEP shift mode is inhibited, when the ATF oil temperature is lower than or equal to the second oil temperature threshold value (the lockup engagement permission threshold value) while the vehicle is running, wherein the second oil temperature threshold value is set higher than or equal to the first oil temperature threshold value with which engagement of lockup clutch 3 is permitted (S1 to S3 in FIG. 8). The first embodiment is further configured such that when the ATF oil temperature is higher than the second oil temperature threshold value (the lockup engagement permission threshold value), the shifting based on the DSTEP shift mode is permitted (S1, S2, and S5 in this order in FIG. 8).

Namely, the shifting based on the DSTEP shift mode is permitted, while the vehicle is running under the oil temperature condition causing the lockup clutch 3 to be disengaged. This serves to suppress the uncomfortable feeling of the driver due to lack of stability of primary rotational speed Npri (equal to the transmission input rotational speed), which is caused, for example, when the engine rotational speed does not decrease but remains high, in the case where the shifting based on the DSTEP shift mode is permitted at low oil temperature. Then, when the vehicle is running under the oil temperature condition causing the lockup clutch 3 to be engaged, the shifting based on the DSTEP shift mode is permitted. This serves to provide the DSTEP shifting (the simulated step shifting) with engine 1 and variator 4 directly connected through the engaged lockup clutch 3, and cause primary rotational speed Npri (equal to the transmission input rotational speed) to follow stepwise changes of the transmission ratio. In addition, the DSTEP shifting (the simulated step shifting) with engine 1 and variator 4 directly connected serves to allow the driver to obtain a direct step shift feel that characterizes the shifting of the DSTEP shift mode.

The first embodiment is configured such that in the shift mode switching control, the first oil temperature threshold value and the second oil temperature threshold value are set to an identical oil temperature value. For example, if the second oil temperature threshold value is set higher than the first oil temperature threshold value, it is necessary to await rise of the ATF oil temperature to the second oil temperature threshold value, for permitting the shifting based on the DSTEP shift mode, even when the ATF oil temperature becomes higher than or equal to the first oil temperature threshold value to cause the lockup clutch to be engaged. In contrast, if the first oil temperature threshold value and the second oil temperature threshold value are set to an identical oil temperature value, the oil temperature condition causing the lockup clutch 3 to be engaged is equal to the oil temperature condition causing the shifting of the DSTEP shift mode to be permitted. Accordingly, the shifting based on the DSTEP shift mode is permitted, without awaiting rise of the oil temperature after engagement of lockup clutch 3. This serves to permit the shifting based on the DSTEP shift mode in a wide oil temperature range, while suppressing the driver from feeling uncomfortable.

The first embodiment is configured to set the first oil temperature threshold value and the second oil temperature threshold value, which are set to the identical oil temperature value, to a lockup engagement permission threshold value, wherein the lockup engagement permission threshold value is set as an oil temperature at which engagement of lockup clutch 3 is permitted in the lockup control. Namely, the lockup engagement permission threshold value, which is set at the lockup control side, is used also for the oil temperature condition for permitting the shifting based on the DSTEP shift mode. The feature that the lockup engagement permission threshold value is used for the oil temperature condition for prioritizing the lockup engagement serves to eliminate the necessity of setting an additional threshold value, and set the oil temperature condition permitting the shifting of the DSTEP shift mode to the lowest possible oil temperature value. This serves to permit the shifting based on the DSTEP shift mode in the widest oil temperature range, while making it easy to set the oil temperature condition permitting the shifting of the DSTEP shift mode.

The first embodiment is configured to set the lockup engagement permission threshold value to an oil temperature value such that as a required time period of response of oil pressure for completing a disengagement of lockup clutch 3 after commanding the disengagement of lockup clutch 3, a target time period of response of oil pressure requested during rapid deceleration of the vehicle to a halt is fulfilled (S1 in FIG. 8). Namely, when the vehicle is rapidly decelerated to a halt, it is possible to obtain a response of oil pressure such that disengagement of lockup clutch 3 is completed before the vehicle is stopped. This serves to prevent the engine 1 from stalling due to delay of disengagement of lockup clutch 3, when the vehicle is rapidly decelerated to a halt.

The first embodiment employs a linear shift mode as a shift mode, wherein the linear shift mode is configured to generate a shift line for acceleration in response to accelerator depressing operation indicative of a driver's acceleration request, and control the transmission ratio. Furthermore, if the linear shift mode is being selected when the oil temperature condition is satisfied, the result of permission determination for the shifting of the DSTEP shift mode is maintained (S1, S2, and S4 in this order in FIG. 8). For example, if the permission determination of the shifting of the DSTEP shift mode is set to permission immediately after the oil temperature condition shifts from the unsatisfied state to the satisfied state, it is possible that the shift control based on the DSTEP shift mode is started suddenly during the shift control based on the linear shift mode. In this situation, the sudden switching between the shift modes causes the driver to feel uncomfortable. The feature that the condition of selection of the linear shift mode is added to the shift permission determination, serves to suppress the driver from feeling uncomfortable due to the sudden switching between the shift modes, when the oil temperature condition shifts from the unsatisfied state to the satisfied state.

The first embodiment is configured such that when the shifting of the DSTEP shift mode is determined to be permitted in the shift mode switching control, the shifting of the DSTEP shift mode is started after awaiting the DSTEP shift request resulting from crossing of the operating point (VSP, APO) on the shift map with the DSTEP shift line employed by the DSTEP shift mode (S11, S12, and S13 in this order in FIG. 8). For example, if the shifting of the DSTEP shift mode is performed immediately when the shift of the DSTEP shift mode is determined to be permitted, it is possible that the operating point (VSP, APO) on the shift map jumps in one stroke beyond a width of deviation. In this situation, the transmission ratio rapidly changes, and thereby causes the driver to feel uncomfortable. The feature that the shifting of the DSTEP shift mode is started depending on the shift permission determination, serves to suppress the driver from feeling uncomfortable due to rapid change of the transmission ratio.

The following describes effects. The vehicular continuously variable transmission control device according to the first embodiment produces the following listed effects.

(1) In a vehicle (engine vehicle), wherein a torque converter 2 and a continuously variable transmission mechanism (variator 4) are mounted in a driveline from a drive source (engine 1) to a driving wheel 7 in the vehicle, and wherein the torque converter 2 includes a lockup clutch 3, a vehicular continuously variable transmission control device comprises: a lockup control means (transmission controller 12, FIG. 3) configured to control engagement and disengagement of the lockup clutch 3; a shift mode switching control means (transmission controller 12, FIG. 8) configured to control switching between a continuous shift mode and a simulated step shift mode (DSTEP shift mode), wherein the continuous shift mode is configured to vary a transmission ratio of the continuously variable transmission mechanism (variator 4) in a continuous manner, and wherein the simulated step shift mode is configured to vary the transmission ratio of the continuously variable transmission mechanism (variator 4) in a stepwise manner; and an oil temperature sensing means (oil temperature sensor 44) configured to sense an oil temperature of working oil for shifting of the continuously variable transmission mechanism (variator 4); wherein the shift mode switching control means (FIG. 8) is configured to: permit engagement of the lockup clutch 3, in response to a condition that a sensed value of the oil temperature is higher than a first oil temperature threshold value while the vehicle is running; inhibit the simulated step shift mode (DSTEP shift mode) from being employed for shifting, in response to a condition that the sensed value of the oil temperature is lower than or equal to a second oil temperature threshold value (lockup engagement permission threshold value), wherein the second oil temperature threshold value is set higher than or equal to the first oil temperature threshold value; and permit the simulated step shift mode (DSTEP shift mode) to be employed for shifting, in response to a condition that the sensed value of the oil temperature is higher than the second oil temperature threshold value (lockup engagement permission threshold value). This serves to provide a driver with a direct step shift feel by simulated step shifting (DSTEP shifting) while suppressing the driver from feeling uncomfortable.

(2) The shift mode switching control means (FIG. 8) is configured to set the first oil temperature threshold value and the second oil temperature threshold value to an identical oil temperature value. This serves to permit the shifting based on the simulated step shift mode (DSTEP shift mode) in a wide oil temperature range, while suppressing the driver from feeling uncomfortable, in addition to the effects of (1).

(3) The shift mode switching control means (FIG. 8) is configured to set the first oil temperature threshold value and the second oil temperature threshold value, which are set to the identical oil temperature value, to a lockup engagement permission threshold value, wherein the lockup engagement permission threshold value is set as an oil temperature at which engagement of the lockup clutch 3 is permitted by the lockup control means (transmission controller 12) (S1 in FIG. 8). This serves to permit the shifting based on the simulated step shift mode (DSTEP shift mode) in the widest oil temperature range, while making it easy to set the oil temperature condition permitting the shifting of the simulated step shift mode (DSTEP shift mode), in addition to the effects of (2).

(4) The drive source includes an engine 1; and the shift mode switching control means (FIG. 8) is configured to set the lockup engagement permission threshold value to an oil temperature value such that a required time period of response of oil pressure for completing a disengagement of the lockup clutch 3 after commanding the disengagement of the lockup clutch 3 is shorter than or equal to a target time period of response of oil pressure requested during rapid deceleration of the vehicle to a halt. This serves to prevent the engine 1 from stalling due to delay of disengagement of lockup clutch 3, when the vehicle is rapidly decelerated to a halt, in addition to the effects of (3).

(5) The shift mode switching control means (FIG. 8) is configured to: employ a linear shift mode as a shift mode, wherein the linear shift mode is configured to generate a shift line for acceleration, in response to an accelerator depressing operation indicative of a driver's acceleration request, and control the transmission ratio; and keep a result of shift permission determination for the simulated step shift mode (DSTEP shift mode), in response to a situation where the linear shift mode is selected when the oil temperature condition is satisfied (S1, S2, and S4 in this order in FIG. 8). Specifically, the shift mode switching control means is configured to prevent the simulated step shift mode (DSTEP shift mode) from being permitted to be employed for shifting, in response to a situation where the linear shift mode is selected when the sensed value of the oil temperature is lower than or equal to the second oil temperature threshold value while the vehicle is running, and the linear shift mode continues to be selected even when the sensed value of the oil temperature becomes higher than the second oil temperature threshold value (lockup engagement permission threshold value). This serves to suppress the driver from feeling uncomfortable due to the sudden switching between the shift modes, when the oil temperature condition shifts from the unsatisfied state to the satisfied state, namely, when the sensed value of the oil temperature becomes higher than the second oil temperature threshold value from being lower than or equal to the second oil temperature threshold value, in addition to the effects of (1).

(6) The shift mode switching control means (FIG. 8) is configured to start to employ the simulated step shift mode (DSTEP shift mode) for shifting, after awaiting a shift request resulting from crossing of an operating point with a step shift line (DSTEP shift line) on a shift map, wherein the step shift line is employed by the simulated step shift mode (DSTEP shift mode), when it is determined that the simulated step shift mode (DSTEP shift mode) is permitted to be employed for shifting (S11, S12, and S13 in this order in FIG. 8). This serves to suppress the driver from feeling uncomfortable due to rapid change of the transmission ratio, when the shifting of the simulated step shift mode (DSTEP shift mode) is started depending on the shift permission determination, in addition to the effects of (1) to (5).

Although the vehicular continuously variable transmission control device according to the present invention has been described with reference to the first embodiment as described above, specific configuration of the present invention is not limited to the first embodiment, but may be carried out with design modification and addition without going out of the substance of the present invention related to the present claims.

In the first embodiment, the example is shown where the continuously variable transmission mechanism is implemented by variator 4 that is a belt-type continuously variable transmission mechanism. However, the continuously variable transmission mechanism may be implemented by a toroidal-type continuously variable transmission mechanism other than belt-type continuously variable transmission mechanisms, for example.

In the first embodiment, the shift mode switching control means is implemented by the example where the first oil temperature threshold value and the second oil temperature threshold value are set to the identical oil temperature value, namely, the lockup engagement permission threshold value. However, the shift mode switching control means may be implemented by an example where the first oil temperature threshold value is set to an oil temperature value causing the engagement of the lockup clutch to be permitted, wherein the second oil temperature threshold value is set to an oil temperature value that is higher than the first oil temperature threshold value and different from the first oil temperature threshold value. Furthermore, the first oil temperature threshold value and the second oil temperature threshold value may be set to the identical oil temperature value, which is different from the lockup engagement permission threshold value, and is higher than the lockup engagement permission threshold value.

In the first embodiment, the shift modes include not only the continuous shift mode and the DSTEP shift mode, but also the linear shift mode configured to generate a for-acceleration shift line when accelerator depressing operation is performed which indicates a driver's acceleration request, and control the transmission ratio. However, the shift mode setting means may be configured to employ the continuous shift mode and the simulated step shift mode without the linear shift mode.

In the first embodiment, the vehicular continuously variable transmission control device according to the present invention is applied to the engine vehicle. However, the vehicular continuously variable transmission control device according to the present invention may be applied to electric vehicles such as hybrid electric vehicles, electric vehicles, fuel-cell electric vehicles. In other words, the vehicular continuously variable transmission control device according to the present invention may be applied to a vehicle, if a torque converter and a continuously variable transmission mechanism are mounted in a driveline from a drive source to a driving wheel in the vehicle, wherein the torque converter includes a lockup clutch.

The invention claimed is:

1. A vehicular continuously variable transmission control device in a vehicle, wherein a torque converter and a continuously variable transmission mechanism are mounted in a driveline from a drive source to a driving wheel in the vehicle, and wherein the torque converter includes a lockup clutch, the vehicular continuously variable transmission control device comprising:
   a lockup control section configured to control engagement and disengagement of the lockup clutch;
   a shift mode switching control section configured to control switching between a continuous shift mode and a simulated step shift mode, wherein the continuous shift mode is configured to vary a transmission ratio of the continuously variable transmission mechanism in a continuous manner, and wherein the simulated step shift mode is configured to vary the transmission ratio of the continuously variable transmission mechanism in a stepwise manner by simulating step shifting in a region of input rotational speed sandwiched between an upshift determination rotational speed and an upshift destination rotational speed; and
   an oil temperature sensing section configured to sense an oil temperature of working oil for shifting of the continuously variable transmission mechanism;
   wherein the shift mode switching control section is configured to:
      permit engagement of the lockup clutch, in response to a condition that a sensed value of the oil temperature is higher than a first oil temperature threshold value while the vehicle is running;
      inhibit the simulated step shift mode from being employed for shifting, in response to a condition that the sensed value of the oil temperature is lower than or equal to a second oil temperature threshold value, wherein the second oil temperature threshold value is set higher than or equal to the first oil temperature threshold value; and
      permit the simulated step shift mode to be employed for shifting, in response to a condition that the sensed value of the oil temperature is higher than the second oil temperature threshold value.

2. The vehicular continuously variable transmission control device as claimed in claim 1, wherein the shift mode switching control section is configured to set the first oil temperature threshold value and the second oil temperature threshold value to an identical oil temperature value.

3. The vehicular continuously variable transmission control device as claimed in claim 2, wherein the shift mode switching control section is configured to set the first oil temperature threshold value and the second oil temperature threshold value, which are set to the identical oil temperature value, to a lockup engagement permission threshold value, wherein the lockup engagement permission threshold value is set as an oil temperature at which engagement of the lockup clutch is permitted by the lockup control section.

4. The vehicular continuously variable transmission control device as claimed in claim 3, wherein:
the drive source includes an engine; and
the shift mode switching control section is configured to set the lockup engagement permission threshold value to an oil temperature value such that a required time period of response of oil pressure for completing a disengagement of the lockup clutch after commanding the disengagement of the lockup clutch is shorter than or equal to a target time period of response of oil pressure requested during rapid deceleration of the vehicle to a halt.

5. The vehicular continuously variable transmission control device as claimed in claim 1, wherein the shift mode switching control section is configured to:
employ a linear shift mode as a shift mode, wherein the linear shift mode is configured to generate a shift line for acceleration, in response to an accelerator depressing operation indicative of a driver's acceleration request, and control the transmission ratio; and
prevent the simulated step shift mode from being permitted to be employed for shifting, in response to a situation where the linear shift mode is selected when the sensed value of the oil temperature is lower than or equal to the second oil temperature threshold value, and the linear shift mode continues to be selected even when the sensed value of the oil temperature becomes higher than the second oil temperature threshold value.

6. The vehicular continuously variable transmission control device as claimed in claim 1, wherein the shift mode switching control section is configured to start to employ the simulated step shift mode for shifting, after awaiting a shift request resulting from crossing of an operating point with a step shift line on a shift map, wherein the step shift line is employed by the simulated step shift mode, when it is determined that the simulated step shift mode is permitted to be employed for shifting.

7. A vehicular continuously variable transmission control method for a vehicle including a torque converter including a lockup clutch, the vehicular continuously variable transmission control method comprising:
switching the lockup clutch between engaged state and disengaged state, depending on vehicle speed;
switching from a continuous shift mode to a simulated step shift mode, in response to accelerator depressing operation, wherein the continuous shift mode is configured to vary a transmission ratio of a continuously variable transmission mechanism in a continuous manner, and wherein the simulated step shift mode is configured to vary the transmission ratio of the continuously variable transmission mechanism in a stepwise manner;
permitting engagement of the lockup clutch, and permitting the simulated step shift mode to be employed for shifting, in response to a condition that an oil temperature of the continuously variable transmission mechanism is higher than a first oil temperature threshold value; and
preventing engagement of the lockup clutch from being permitted, and preventing the simulated step shift mode from being permitted to be employed for shifting, in response to a condition that the oil temperature of the continuously variable transmission mechanism is lower than or equal to the first oil temperature threshold value.

* * * * *